United States Patent Office 3,078,275
Patented Feb. 19, 1963

3,078,275
N,N - DISUBSTITUTED-ALPHA-(TERTIARYAMINO-ALKYL)-ALPHA,ALPHA-DIPHENYLACETAMIDES
Robert B. Moffett and Brooke D. Aspergren, Kalamazoo, Mich., assignors to The Upjohn Company, Kalamazoo, Mich., a corporation of Michigan
No Drawing. Filed May 28, 1956, Ser. No. 587,489
8 Claims. (Cl. 260—326.3)

The present invention relates to novel organic compounds and is more particularly concerned with novel N,N - disubstituted - α - (tertiaryaminoalkyl) - α,α - diphenylacetamides.

The compounds of the present invention can be represented by the following basic general formula:

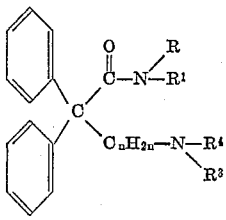

and can exist in the form of the free base or coordination compound thereof such as acid addition salts, quaternary ammonium compounds, amine oxides, and amine-oxide acid addition salts. In the basic general formula $n$ is an integer from two to six, inclusive, —$C_nH_{2n}$— is an alkylene radical having at least two carbon atoms between the valences, $R^1$ and $R^2$ are selected from the group consisting of a lower-alkyl radical and when taken together with —N< represent pyrrolidino and an alkyl-substituted pyrrolidino radical, $R^3$ and $R^4$ are selected from the group consisting of a lower-alkyl radical and when taken together with —N< represent an alkyl-substituted pyrrolidino radical. The lower-alkyl radicals can be alike or different. Examples of lower-alkyl radicals are methyl, ethyl, propyl, butyl, hexyl, octyl, and the like, including isomeric forms thereof. Alkyl-substituted pyrrolidino radicals include 2,2-dimethylpyrrolidino, 2-methylpyrrolidino, 2,2,4-trimethylpyrrolidino, and the like. The α,α-diphenyl radicals represent unsubstituted phenyl as well as substituted phenyl radicals which can be substituted with indifferent substituents such as lower-alkoxy, lower-alkyl, halogen, and the like.

The compounds of the present invention are characterized by good diuretic and oxytocic properties with a minimum of anticholinergic activity, e.g., antisecretory and antispasmodic activity, and are, therefore, indicated for use as an oxytocic or diuretic where anticholinergic side-effects are undesired.

A few N,N-disubstituted-α-(tertiaryaminoalkyl)-α,α-diphenylacetamides are known in the prior art. For example, Cheney et al., J. Org. Chem., 17, 770 (1952), show the preparation of 1-(2,2-diphenyl-4-piperidino-butyryl)-piperidine and N,N-dimethyl-α,α-diphenyl-1-piperidinebutyramide. These compounds have little or no anticholinergic, diuretic, nor oxytocic activity.

In view of the prior art it is quite unexpected, therefore, that the compounds of the present invention show diuretic and oxytocic activity with a minimum of anticholinergic activity.

The compounds of the present invention can be prepared by the following process, $R^1$, $R^2$, $R^3$, $R^4$, $n$, and —$C_nH_{2n}$— having the same meanings as given above.

(A) 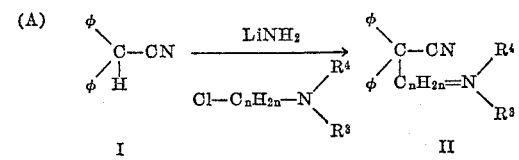

(B) 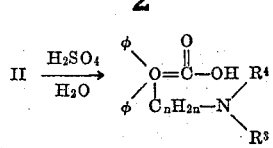

(C) 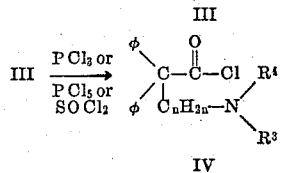

(D) 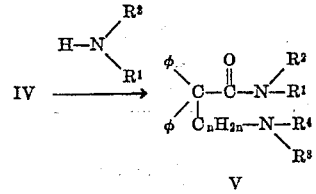

Step A can be accomplished by utilizing the procedure of Cheney et al., supra. The starting diphenylacetonitriles can be prepared by the procedure outlined by Hogh, Compt. rend., 197, 770 (1933).

Step B can be carried out by the process disclosed by Clarke et al., J. Am. Chem. Soc., 71,2821, 1949, or Gardner et al., J. Am. Chem. Soc., 70, 2906, 1948.

Step C can be carried out by the procedure shown by Clarke et al., supra. When the

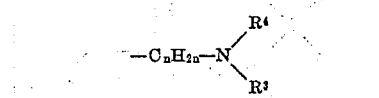

group is

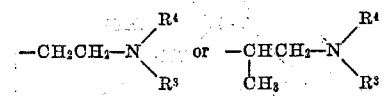

the phosphorus chlorides are preferable. When these particular groupings are present, it has been found that the use of thionyl chloride tends to increase the formation of side-products, principally pyrrolidone derivatives.

Step D is advantageously carried out in an inert diluent or solvent such as benzene, toluene, xylene, aliphatic hydrocarbon solvents, halogenated hydrocarbon solvents, di-lower-alkyl ethers, and the like. The reactants are advantageously mixed with cooling, as on an ice bath, and the reaction is completed under reflux.

An alternative process for the preparation of the compounds of the present invention can be carried out as follows, $n$, $R^1$, $R^2$, $R^3$, $R^4$, and —$C_nH_{2n}$— having the same meanings as given above:

(E) 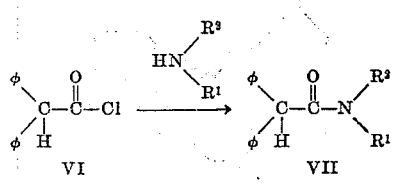

(F) 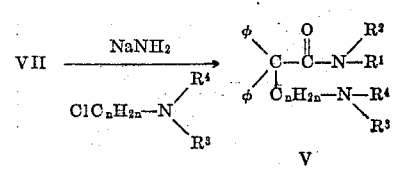

The starting diphenylacetyl chlorides can be prepared in the manner disclosed by Whitmore et al., J. Am. Chem. Soc., 63, 643 (1941). Steps E and F can be carried out in the same manner as aforementioned steps D and A, respectively.

As noted above, the compounds of the invention are characteristically differentiated from the prior art N,N-disubstituted - α - (tertiaryaminoalkyl) - α,α - diphenyl - acetamides by lack of significant anticholinergic activity, while possessing oxytocic and diuretic activity. The compounds of the invention therefore are particularly useful for uterine stimulation and for diuresis in situations where anticholinergic side-effects are undesirable. For such purposes the free bases of the invention are most advantageously administered in the form of their acid addition salts with pharmacologically acceptable acids such as hydrochloric, hydrobromic, sulfuric, phosphoric, lactic, citric, tartaric, benzoic, salicylic, succinic, and acetic acids, and the like.

The data given in Table I, shown below, are illustrative of the differentiating effects noted above. The antispasmodic index was determined by intravenous administration to Thiry-Vella dogs and equated to atropine equals 1.0 (low values mean low activity). The antisecretory activity was determined intravenously in rats and is given as the $ED_{50}$ in mg./kg.—the effective dose necessary to reduce gastric secretion by fifty percent (low values mean high activity). Oxytocic (uterine) activity was determined intravenously in cats at doses ranging from 0.25 to two mg./kg. and rated in the following order of stimulation: Pronounced, Fair, Slight, Nil. The diuretic activity was determined orally in rats at doses of 5, 10, and 20 mg./kg. and rated in the following order: Excellent, Good, Fair, Mild, Slight, and Nil.

TABLE I

| Compound | | Anticholinergic activity | | Uterine activity | | Diuretic activity | |
|---|---|---|---|---|---|---|---|
| | | Antispasmodic index | Antisecretory activity | Rating | Dose, mg./kg. | Rating | Dose, mg./kg. |
| [structure: φ₂C(C(O)-N-piperidine)(CH₂CH₂-N-piperidine)·HCl] | Prior art | Inactive | Inactive | N | 2.0 | N | 20 |
| [structure: φ₂C(C(O)-N(CH₃)₂)(CH₂CH₂-N-piperidine)·HCl] | do | do | do | N | 2.0 | S | 20 |
| [structure: φ₂C(C(O)-N(CH₃)₂)(CH₂CH(CH₃)-N(CH₃)₂)·HCl, racemic] | Ex. 1, Part D | do | do | S | 1.0 | E | 5 |
| [structure: φ₂C(C(O)-N(CH₃)₂)(CH₂CH(CH₃)-N(CH₃)₂→O)·HBr] | Ex. 1, Part G | | | | | E | 20 |
| [structure: φ₂C(C(O)-N(CH₃)₂)(CH₂CH₂-N-pyrrolidine)·HCl] | Ex. 12, Part B | Inactive | Inactive | P | 1 | E | 5 |
| [structure: φ₂C(C(O)-N(CH₃)₂)(CH₂CH₂-N-pyrrolidine N-oxide)·HBr] | Ex. 12, Part E | | | | | G | 10 |

TABLE I—Continued
| Compound | | Anticholinergic activity | | Uterine activity | | Diuretic activity | |
|---|---|---|---|---|---|---|---|
| | | Antispasmodic index | Antisecretory activity | Rating | Dose, mg/kg. | Rating | Dose, mg./kg. |
| 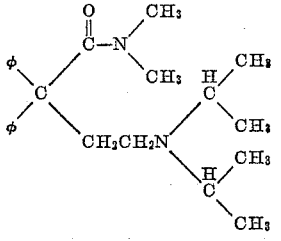 | Ex. 13, Part B | Inactive | | P | 1 | G | 5 |
| 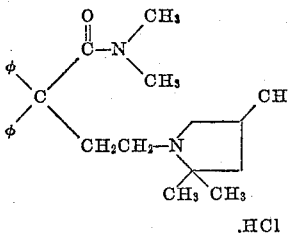 | Ex. 14, Part B | do | | | | E | 20 |
| 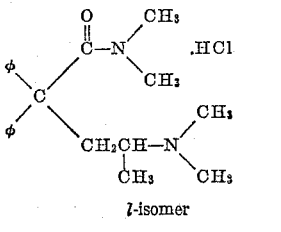 l-isomer | Ex. 4, Part D | | | | | E | 10 |
| 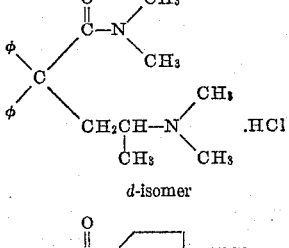 d-isomer | Ex. 5, Part D | | | | | E | 10 |
| 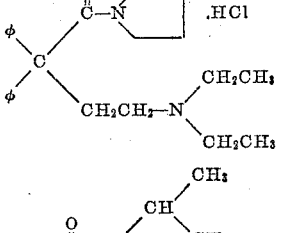 | Ex. 7, Part C | Inactive | Inactive | F | 1.0 | E | 10 |
| 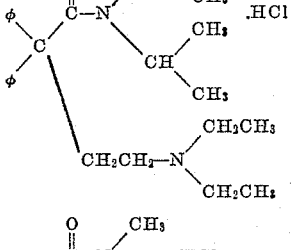 | Ex. 8, Part C | do | do | S | 1.0 | E | 20 |
| 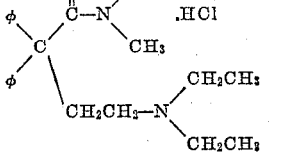 | Ex. 10, Part B | do | 60 percent at 1 mg./kg. | P | 1 | E | 10 |

TABLE I—Continued

| Compound | | Anticholinergic activity | | Uterine activity | | Diuretic activity | |
|---|---|---|---|---|---|---|---|
| | | Antispasmodic index | Antisecretory activity | Rating | Dose, mg./kg. | Rating | Dose, mg./kg. |
| 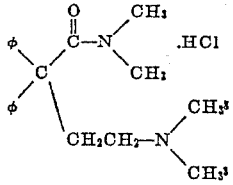 | Ex. 11, Part B | ...do...... | Inactive...... | S | 2 | E | 10 |

The following examples are illustrative of the process and products of the present invention, but are not to be construed as limiting.

EXAMPLE 1

*Preparation of 4 - Dimethylamino - N, - N - Dimethyl-2,2-Diphenylvaleramide Free Base and Derivatives Thereof*

(A) ACID SULFATE OF 4-DIMETHYLAMINO-2,2-DIPHENYL VALERIC ACID

A solution of 600 milliliters of concentrated sulfuric acid and 350 milliliters of water was cooled in an ice bath and then gradually added, with stirring, to a three-liter flask containing 500 grams (1.8) moles of 4-dimethylamino-2,2-diphenylvaleronitrile (Cheney et al., supra). The reaction mixture was stirred and heated at 150 degrees centigrade for five hours, allowed to stand overnight, and filtered through a sintered-glass funnel. The resulting crude, solid product was washed with cold absolute ethyl alcohol and recrystallized from three liters of methyl alcohol. There was thus obtained 627 grams (88 percent yield) of the acid sulfate of 4-dimethylamino-2,2-diphenyl-valeric acid, melting point 220–222 degrees centigrade.

(B) ACID SULFATE OF 4-DIMETHYLAMINO-2,2-DIPHENYLVALERYL CHLORIDE

Thionyl chloride (525 milliliters) was rapidly added with stirring to 350 grams (0.885) mole of the acid sulfate of 4-dimethylamino-2,2-diphenylvaleric acid (part A, this example). The reaction mixture was stirred for 1.5 hours at room temperature and then for one hour on a steam bath. Excess thionyl chloride was removed by distillation under reduced pressure at fifty degrees centigrade until the mixture solidified. Then 500 milliliters of benzene was added, and about one-half of it was removed by distillation under reduced pressure. The resulting slurry was filtered; the recovered solid was washed successively with benzene and ether, and dried in a vacuum desiccator over calcium chloride. There was thus obtained in crystalline condition 355 grams (97 percent yield) of the acid sulfate of 4-dimethyl-amino-2,2-diphenylvaleryl chloride.

(C) 4-DIMETHYLAMINO-N,N-DIMETHYL-2,-DIPHENYL-VALERAMIDE FREE BASE

A slurry of fifty grams (0.12 mole) of the acid sulfate of 4-dimethylamino-2,2-diphenylvaleryl chloride (part B, this example) and 100 milliliters of benzene was placed in a one-liter, three-neck flask equipped with a reflux condenser, stirrer, and dropping funnel. A solution of 25 grams (0.55 mole) of dimethylamine in 100 milliliters of benzene was gradually added, with stirring and ice-bath cooling. The reaction mixture was allowed to stand at room temperature for two hours and was then refluxed on a steam bath for one-half hour. It was washed with 300 milliliters of water and extracted with an acid solution prepared by adding 75 milliliters of concentrated hydrochloric acid to 200 milliliters of water. To the acid extract was added 200 milliliters of aqueous twenty percent sodium hydroxide solution. The resulting gum was extracted with benzene. The solution was dried with anhydrous sodium sulfate and benzene was removed by distillation under reduced pressure, 4-dimethylamino-N,N-dimethyl-2,2-diphenylvaleramide free base being thus obtained as a viscous oil.

(D) 4-DIMETHYLAMINO-N,N-DIMETHYL-2,2-DIPHENYL-VALERAMIDE HYDROCHLORIDE

The 4-dimethylamino-N,N-dimethyl-2,2-diphenylvaleramide free base obtained in part C, this example, was dissolved in 200 milliliters of ethyl acetate, and the solution was acidified with ethanolic hydrogen chloride. Upon evaporation of the acidified solution there was obtained an 83 percent yield of white, crystalline 4-dimethylamino-N,N-dimethyl-2,2-diphenylvaleramide hydrochloride having a melting point of 199–201 degrees centigrade and the following analysis:

*Analysis.*—Calcd. for $C_{21}H_{29}ClN_2O$: C, 69.88; H, 8.10; Cl, 9.82; N, 7.76. Found: C, 69.56; H, 8.16; Cl, 9.91; N, 8.01.

(E) 4-DIMETHYLAMINO-N,N-DIMETHYL-2,2-DIPHENYL-VALERAMIDE METHOBROMIDE MONOHYDRATE

The procedure of part C, this example, was repeated to provide another lot of 4-dimethylamino-N,N-dimethyl-2,2-diphenylvaleramide free base. The free base was dissolved in fifty milliliters of methyl ethyl ketone, fifty grams of methyl bromide was added, and the solution was allowed to stand in a stoppered flask for three days at room temperature. The volume was reduced by about two-thirds by means of steam-bath heating and ether was then added. The resulting gummy material was recrystallized from an ethyl alcohol-ethyl acetate mixture to obtain white, crystalline 4-dimethylamino-N,N-dimethyl-2,2-diphenylvaleramide methobromide monohydrate having a melting point of 161–163 degrees centigrade and the following analysis:

*Analysis.*—Calcd. for $C_{22}H_{33}BrN_2O_2$: C, 60.40; H, 7.60; Br, 18.27; N, 6.41. Found: C, 60.22; H, 7.25; Br, 18.57; N, 6.47.

(F) 4-DIMETHYLAMINO-N,N-DIMETHYL-2,2-DIPHENYL-VALERAMIDE N-OXIDE FREE BASE

4 - dimethylamino - N,N - dimethyl-2,2-diphenylvaleramide hydrochloride (14.4 grams, 0.04 mole), part D, this example, was treated with twenty milliliters of aqueous ten percent sodium hydroxide solution, and the mixture was extracted twice with ether. The combined ether extracts were washed successively with water and aqueous saturated sodium chloride solution and then evaporated to dryness. The resulting viscous, oily 4-dimethylamino - N,N-dimethyl-2,2-diphenylvaleramide free base was dissolved in 150 milliliters of methanol, and ten milliliters of thirty percent hydrogen peroxide was added to the solution. After the reaction mixture had stood for two days at room temperature, an aqueous slurry of platinum-on-charcoal was added, and the mixture was agitated for 1.5 hours and filtered. The filtrate was evaporated to dryness under reduced pressure, 4-dimethylamino - N,N - dimethyl - 2,2 - diphenylvaleramide N-oxide free base being thus obtained as a gum.

(G) 4-DIMETHYLAMINO-N,N-DIMETHYL-2,2-DIPHENYL-VALERAMIDE N-OXIDE HYDROBROMIDE

Five milliliters of concentrated hydrobromic acid (aqueous 48 percent hydrogen bromide solution) was added to a solution prepared by dissolving the 4-dimethylamino - N,N - dimethyl-2,2-diphenylvaleramide N-oxide free base of part F, this example, in an ether-ethyl acetate mixture. An oil separated which became crystalline upon the addition of more ether and scratching. This white, crystalline product, 4-dimethylamino-N,N-dimethyl-2,2-diphenylvaleramide N-oxide hydrobromide, after being washed with ether and dried, weighed 15.1 grams (89.5 percent yield) and had a melting point of 109–114 degrees centigrade. The product was further purified by recrystallization from ether-isopropyl alcohol mixture, after which it weighed 11.58 grams and had a melting point of 116–119 degrees centigrade and the following analysis:

Analysis.—Calcd. for $C_{21}H_{29}BrN_2O_2$: Br, 18.97; N, 6.65. Found: Br, 18.95; N, 6.63.

EXAMPLE 2

Preparation of 4-Dimethylamino-N,N-Diisopropyl-2,2-Diphenylvaleramide Free Base and Hydrochloride Thereof Diisopropylamine was substituted for dimethylamine in the procedure of Example 1, part C, to obtain 4-dimethylamino - N,N - diisopropyl-2,2-diphenylvaleramide free base as an oil. By substituting this tertiary amine for the tertiary amine employed in the procedure of Example 1, part D, 4-dimethylamino-N,N-diisopropyl-2,2-diphenylvaleramide hydrochloride was obtained as a gummy solid.

EXAMPLE 3

Preparation of 1-(4-Dimethylamino-2,2-Diphenylvaleryl)-2-Methylpyrrolidine Free Base and Derivatives Thereof (A) 1-(4-DIMETHYLAMINO-2,2-DIPHENYLVALERYL)-2-METHYLPYRROLIDINE FREE BASE To a stirred, cooled solution of 43 grams (0.5 mole) of 2-methylpyrrolidine in 100 milliliters of benzene was gradually added 51.7 grams (0.125 mole) of the acid sulfate of 4 - dimethylamino - 2,2 - diphenylvaleryl chloride (Example 1, part B) and stirring was continued for five hours at room temperature. The benzene solution was allowed to stand overnight, washed with water, dried with anhydrous sodium sulfate, and the benzene was removed by distillation at reduced pressure. The desired product, 1-(4-dimethylamino - 2,2 - diphenylvaleryl)-2-methylpyrrolidine free base, was thus obtained as an oil.

(B) 1-(4-DIMETHYLAMINO-2,2-DIPHENYLVALERYL)-2-METHYLPYRROLIDINE HYDROCHLORIDE

A slight excess of ethanolic hydrogen chloride was added to an ethyl acetate solution of 1-(4-dimethylamino-2,2-diphenylvaleryl)-2-methylpyrrolidine free base. Addition of ether precipitated a white solid which was recrystallized from ethyl acetate. There was thus obtained solid 1-(4-dimethylamino-2,2-diphenylvaleryl)-2-methylpyrrolidine hydrochloride.

(C) 1-(4-DIMETHYLAMINO-2,2-DIPHENYLVALERYL)-2-METHYLPYRROLIDINE METHOBROMIDE

A large excess of methyl bromide was added to a benzene solution of 1-(4-dimethylamino-2,2-diphenylvaleryl)-2-methylpyrrolidine free base. This solution, after being allowed to stand for several days at room temperature, was heated to remove excess methyl bromide, after which dry ether was added to precipitate the desired product, 1-(4-dimethylamino - 2,2 - diphenylvaleryl)-2-methylpyrrolidine methobromide, a solid which was recovered by filtration.

EXAMPLE 4

Preparation of l-4-Dimethylamino-N,N-Dimethyl-2,2-Diphenylvaleramide Free Base and Derivatives Thereof (A) ACID SULFATE OF l-4-DIMETHYLAMINO-2,2-DIPHENYLVALERIC ACID The acid sulfate of l-4-dimethylamino-2,2-diphenylvaleric acid was prepared according to the procedure of Example 1, part A, by replacing the racemic 4-dimethylamino-2,2-diphenylvaleronitrile employed therein with l-4-dimethylamino-2,2-diphenylvaleronitrile [Pohland et al., J. Am. Chem. Soc. 71, 461 (1949)].

(B) ACID SULFATE OF l-4-DIMETHYLAMINO-2,2-DIPHENYLVALERYL CHLORIDE

The acid sulfate of l-4-dimethylamino-2,2-diphenylvaleryl chloride was prepared according to the procedure of Example 1, part B, by replacing the acid sulfate of racemic 4-dimethylamino-2,2-diphenylvaleric acid employed therein with the acid sulfate of l-4-dimethylamino-2,2-diphenylvaleric acid (part A, this example).

(C) l-4-DIMETHYLAMINO-N,N-DIMETHYL-2,2-DIPHENYLVALERAMIDE FREE BASE

A slurry of 62.1 grams (0.15 mole) of the acid sulfate of l-4-dimethylamino-2,2-diphenylvaleryl chloride (part B, this example) and 150 milliliters of benzene was placed in a one-liter, three-neck flask equipped with a reflux condenser, stirrer, and dropping funnel. A solution of 40.6 grams (0.9 mole) of dimethylamine in 150 milliliters of benzene was gradually added, with stirring and ice-bath cooling. The reaction mixture was stirred at room temperature for two hours and for one-half hour on a steam bath, cooled, washed with water, and extracted with an acid solution prepared by mixing fifty milliliters of concentrated hydrochloric acid and 200 milliliters of water. The acid extract was treated with 200 milliliters of aqueous twenty percent sodium hydroxide solution, and the resulting gum was extracted with benzene. The solution was dried with anhydrous sodium sulfate and benzene was removed by distillation under reduced pressure, 45.1 grams (92.6 percent yield) of l-4-dimethylamino-N,N-dimethyl-2,2-diphenylvaleramide free base being thus obtained as a viscous, straw-colored oil.

(D) l-4-DIMETHYLAMINO-N,N-DIMETHYL-2,2-DIPHENYLVALERAMIDE HYDROCHLORIDE

A slight excess of ethanolic hydrogen chloride was added to a solution of 35 grams (0.108 mole) of l-4-dimethylamino - N,N-dimethyl-2,2-diphenylvaleramide free base (part C, this example) in 200 milliliters of ethyl acetate. The mixture was allowed to stand overnight at refrigerator temperature, boiled for a few minutes to induce crystallization, and stored four days in the refrigerator. There was thus obtained 24.3 grams (62.5 percent yield) of the desired product, l-4-dimethylamino-N,N-dimethyl-2,2-diphenylvaleramide hydrochloride, having a melting point of 191–193 degrees centigrade, $[\alpha]_D^{22}$ minus 63 degrees (c.=0.6 in methyl alcohol), and the following analysis:

Analysis.—Calcd. for $C_{21}H_{29}ClN_2O$: C, 69.88; H, 8.10; Cl, 9.82; N, 7.76. Found: C, 69.79; H, 8.24; Cl, 9.83; N, 7.58.

(E) l-4-DIMETHYLAMINO-N,N-DIMETHYL-2,2-DIPHENYLVALERAMIDE METHOBROMIDE

Ten grams (0.031 mole) of l-4-dimethylamino-N,N-dimethyl-2,2-diphenylvaleramide free base (part C, this example) was dissolved in 75 milliliters of methyl ethyl ketone, forty grams (0.42 mole) of cold methyl bromide was added, and the mixture was allowed to stand in a stoppered flask at room temperature for three days. The solution was gently boiled until the volume was reduced to about one-half and then stored in a refrigerator for four days. The resulting crystalline product, l-4-dimethylamino - N,N - dimethyl - 2,2 - diphenylvaleramide methobromide, was recovered; it weighed eight grams (58 percent yield) and had a melting point of 155–157 degrees centigrade, $[\alpha]_D^{22}$ minus six degrees (c.=1.0 in methyl alcohol), and the following analysis:

*Analysis.*—Calcd. for $C_{22}H_{31}BrN_2O$: C, 63.00; H, 7.45; Br, 19.06; N, 6.68. Found: C, 63.26; H, 7.11; Br, 19.23; N, 6.75.

EXAMPLE 5

*Preparation of d-4-Dimethylamino-N,N-Dimethyl-2,2-Diphenylvaleramide Free Base and Derivatives Thereof*

(A) ACID SULFATE OF d-4-DIMETHYLAMINO-2,2-DIPHENYLVALERIC ACID

By following the procedure of Example 4, part A, except for the substitution of d-4-dimethylamino-2,2-diphenylvaleronitrile (Pohland et al., supra) for the l-isomer thereof, there was obtained the acid sulfate of d-4-dimethylamino-2,2-diphenylvaleric acid.

(B) ACID SULFATE OF d-4-DIMETHYLAMINO-2,2-DIPHENYLVALERYL CHLORIDE

By following the procedure of Example 4, part B, except for the substitution of the acid sulfate of d-4-dimethylamino-2,2-diphenylvaleric acid (part A, this example) for the l-isomer thereof, there was obtained the acid sulfate of d-4-dimethylamino-2,2-diphenylvaleryl chloride.

(C) d-4-DIMETHYLAMINO-N,N-DIMETHYL-2,2-DIPHENYLVALERAMIDE FREE BASE

A slurry of 41.4 grams (0.1 mole) of the acid sulfate of d-4-dimethylamino-2,2-diphenylvaleryl chloride (part B, this example) and 100 milliliters of benzene was placed in a one-liter, three-neck flask equipped with a reflux condenser, stirrer, and dropping funnel. A solution of 27.1 grams (0.6 mole) of dimethylamine in 100 milliliters of benzene was gradually added, with stirring and ice-bath cooling. The reaction mixture was stirred for four hours while being permitted to rise to room temperature, heated on a steam bath for fifteen minutes, cooled, washed with water, and extracted with dilute hydrochloric acid (thirty milliliters of concentrated hydrochloric acid and 100 milliliters of water). The acid extract was treated with 100 milliliters of aqueous twenty percent sodium hydroxide solution, and the resulting gum was extracted with benzene. The solution was dried with anhydrous sodium sulfate and benzene was removed by distillation under reduced pressure, 21.5 grams (66.5 percent yield) of d-4-dimethylamino-N,N-dimethyl-2,2-diphenylvaleramide free base being thus obtained as a viscous, straw-colored oil.

(D) d-4-DIMETHYLAMINO-N,N-DIMETHYL-2,2-DIPHENYLVALERAMIDE HYDROCHLORIDE

A slight excess of ethanolic hydrogen chloride was added to a solution of 32 grams (0.1 mole) of d-4-dimethylamino-N,N-dimethyl-2,2 - diphenylvaleramide free base (part C, this example) in 100 milliliters of ethyl acetate. Crystallization was induced by heating the mixture on a steam bath for a few minutes. There was thus obtained 27 grams (64 percent yield) of the desired product, d-4-dimethylamino-N,N-dimethyl-2,2-diphenylvaleramide hydrochloride, which had a melting point of 192–194 degrees centigrade, $[\alpha]_D^{22}$ plus 59 degrees (c.=1.1 in methyl alcohol), and the following analysis:

*Analysis.*—Calcd. for $C_{21}H_{29}ClN_2O$: C, 69.88; H, 8.10; Cl, 9.82; N, 7.76. Found: C, 69.85; H, 8.37; Cl, 9.84; N, 7.45.

(E) d-4-DIMETHYLAMINO-N,N-DIMETHYL-2,2-DIPHENYLVALERAMIDE METHOBROMIDE MONOHYDRATE

Ten grams (0.031 mole) of d-4-dimethylamino-N,N-dimethyl-2,2-diphenylvaleramide free base (part C, this example) was dissolved in 30 milliliters of methyl ethyl ketone, twenty grams (0.21 mole) of cold methyl bromide was added, and the mixture was allowed to stand in a stoppered flask at room temperature overnight. About five minutes heating on the steam bath caused crystallization to occur. The solid product, d-4-dimethylamino-N,N-dimethyl - 2,2 - diphenylvaleramide methobromide monohydrate, weighed 8.6 grams (67 percent yield); it had a melting point of 157–159 degrees centigrade, $[\alpha]_D^{22}$ plus seven degrees (c.=1.0 in methyl alcohol), and the following analysis:

*Analysis.*—Calcd. for $C_{22}H_{32}BrN_2O_2$: C, 60.40; H, 7.60; Br. 18.27; N 6.41. Found: C, 60.87; H, 7.27; Br, 18.35; N, 6.69.

EXAMPLE 6

*Preparation of 5-Diethylamino-N,N-Dimethyl-2,2 - Diphenylvaleramide Free Base and Derivatives Thereof*

(A) ACID SULFATE OF 5-DIETHYLAMINO-2,2-DIPHENYLVALERIC ACID

A solution of 72 milliliters of concentrated sulfuric acid and 42 milliliters of water was added to 61.3 grams (0.2 mole) of 5-diethylamino - 2,2 - diphenylvaleronitrile, and the mixture was stirred and heated at 150 degrees centigrade for five hours. The viscous solution was poured onto cracked ice, and the resulting solid was recrystallized from an ether-isopropyl alcohol mixture. There was thus obtained 46 grams (54 percent yield) of the acid sulfate of 5-diethylamino-2,2-diphenylvaleric acid.

(B) 5-DIETHYLAMINO-N,N - DIMETHYL-2,2-DIPHENYLVALERAMIDE FREE BASE AND HYDROCHLORIDE THEREOF

Thionyl chloride (35 milliliters) was added to a slurry of 22 grams (0.051 mole) of the acid sulfate of 5-diethylamino-2,2-diphenylvaleric acid (part A, this example) and 100 milliliters of benzene, and the mixture was stirred at room temperature for fifteen minutes and then at between fifty and sixty degrees centigrade for fifteen minutes. Benzene and excess thionyl chloride were removed by distillation at reduced pressure, fifty milliliters of benzene was added to the residue and then removed by distillation at reduced pressure, leaving the acid sulfate of 5-diethylamino-2,2-diphenylvaleryl chloride as a viscous oil. Fifty milliliters of benzene was added to the oil, and a solution of eighteen grams (0.4 mole) of dimethylamine in 100 milliliters of benzene was gradually added with stirring and ice-bath cooling. The reaction mixture was stirred for fifteen minutes, allowed to stand overnight, heated under reflux for fifteen minutes, washed with water, and extracted with an acid solution prepared by adding 50 milliliters or concentrated hydrochloric acid to 200 milliliters of water. To the acid extract was added 200 milliliters of aqueous twenty percent sodium hydroxide solution, and the resulting gum was extracted with benzene. The benzene solution was filtered through anhydrous sodium sulfate and evaporated to dryness at reduced pressure to obtain 13 grams (73 percent yield) of viscous, oily 5-diethylamino-N,N-dimethyl-2,2-diphenylvaleramide free base.

This free base was dissolved in 200 milliliters of ethyl acetate and a slight excess of ethanolic hydrogen chloride was added. The mixture was allowed to stand in a refrigerator for several days and the resulting solid was recovered and recrystallized from isopropanol-ether mixture. There was thus obtained 12.6 grams (65 percent yield) of 5-diethylamino-N,N-dimethyl-2,2 - diphenylvaleramide hydrochloride having a melting point of 155–158 degrees centigrade and the following analysis:

*Analysis.*—Calcd. for $C_{23}H_{33}ClN_2O$: C, 71.02; H, 8.55; Cl, 9.12; N, 7.20. Found: C, 70.72; H, 8.48; Cl, 9.18; N, 7.29.

(C) 5-DIETHYLAMINO-N,N-DIMETHYL-2,2-DIPHENYLVALERAMIDE METHOBROMIDE

Forty grams (0.42 mole) of methyl bromide was added to a solution of 5.5 grams (0.0155 mole) of 5-diethylamino-N,N-dimethyl-2,2-diphenylvaleramide free base in fifty milliliters of methyl ethyl ketone, and the stoppered mixture was allowed to stand at room temperature for two days. Ether was added, the mixture was stored overnight in a refrigerator, the supernatant liquid was decanted, and the residue was dissolved in a mixture comprising ethyl acetate and a little ethyl alcohol. Crystallization was induced by boiling the solution on a steam bath, and the mixture was cooled and filtered to obtain five grams (73 percent yield) of 5-diethylamino-N,N-dimethyl-2,2-diphenylvaleramide methobromide having a melting point of 165–166 degrees centigrade and the following analysis:

*Analysis.*—Calcd. for $C_{24}H_{35}BrN_2O$: C, 64.42; H, 7.88; Br, 17.86; N, 6.26. Found: C, 64.30; H, 7.58; Br, 17.93; N, 6.33.

EXAMPLE 7

*Preparation of 1-(4-Diethylamino-2,2-Diphenylbutyryl) Pyrrolidine Free Base and Derivatives Thereof*

(A) 1-DIPHENYLACETYLPYRROLIDINE

A solution of 85.4 grams (1.2 mole) of dry pyrrolidine in 200 milliliters of benzene was gradually added to a stirred solution of 115.3 grams (0.5 mole) of diphenylacetyl chloride in 300 milliliters of benzene. The reaction mixture was stirred for four hours more, allowed to stand overnight, washed with water, and evaporated to dryness. The residue was dissolved in hot benzene and the hot solution was treated with decolorizing charcoal, filtered, and allowed to cool. An 84 percent yield of 1-diphenylacetylpyrrolidine, melting point 163–165 degrees centigrade, was recovered.

*Analysis.*—Calcd. for $C_{18}H_{19}NO$: C, 81.47; H, 7.22; N, 5.28. Found: C, 81.66; H, 7.01; N, 5.38.

(B) 1-(4-DIETHYLAMINO-2,2-DIPHENYLBUTYRYL) PYRROLIDINE FREE BASE 1-diphenylacetylpyrrolidine (53.1 grams, 0.2 mole) (part A, this example) was added portionwise to a slurry of ten grams (0.256 mole) of sodium amide in 500 milliliters of toluene; the mixture was stirred and heated under reflux for four hours. A solution of thirty grams (0.22 mole) of 2-diethylaminoethyl chloride in 100 milliliters of toluene was gradually added in 45 minutes, and the reaction mixture was refluxed an additional fifteen minutes. Then 200 milliliters of water was cautiously added, the aqueous phase was discarded, and the toluene solution was extracted with an acid solution prepared by adding fifty milliliters of concentrated hydrochloric acid to 200 milliliters of water. The acid extract was washed with ether, made alkaline with 200 milliliters of aqueous twenty percent sodium hydroxide solution, and the resulting oil was extracted with benzene. The benzene was removed by distillation under reduced pressure, leaving 72 grams (99 percent yield) of oily 1-(4-diethylamino-2,2-diphenylbutyryl)pyrrolidine free base.

(C) 1-(4-DIETHYLAMINO-2,2-DIPHENYLBUTYRYL) PYRROLIDINE HYDROCHLORIDE

The 1-(4-diethylamino-2,2-diphenylbutyryl)pyrrolidine free base, part B, this example, was dissolved in 200 milliliters of ethyl acetate and a slight excess of ethanolic hydrogen chloride was added. The mixture was allowed to stand in a refrigerator overnight, thereby precipitating 58 grams (74 percent yield) of somewhat yellow 1-(4-diethylamino-2,2-diphenylbutyryl)pyrrolidine hydrochloride. This compound, after several recrystallizations from methyl ethyl ketone, was white and had a melting point of 212–214 degrees centigrade and the following analysis:

*Analysis.*—Calcd. for $C_{24}H_{33}ClN_2O$: C, 71.88; H, 8.30; Cl, 8.84; N, 6.99. Found: C, 72.17; H, 8.06; Cl, 8.49; N, 6.95.

(D) 1-(4-DIETHYLAMINO-2,2-DIPHENYLBUTYRYL) PYRROLIDINE METHOBROMIDE

Fifteen grams (0.0365 mole) of the 1-(4-diethylamino-2,2-diphenylbutyryl)pyrrolidine hydrochloride, part C, this example, was converted to the free base by mixing with an excess of aqueous sodium hydroxide solution and the mixture was extracted with benzene. The benzene solution of the free base, after being dried by removing a part of the benzene by distillation, was cooled and fifty grams of cold methyl bromide was added. After the mixture had stood for four days ether was added, thus precipitating a gummy solid which was successively recrystallized from a mixture of ether and isopropyl alcohol, recrystallized again from methyl ethyl ketone, dried at 75 degrees centigrade under reduced pressure, and dried for fifteen hours at 100 degrees centigrade under reduced pressure. The 1-(4-diethylamino-2,2-diphenylbutyryl)pyrrolidine methobromide thus obtained had a melting point of 174–176 degrees centigrade and the following analysis:

*Analysis.*—Calcd. for $C_{25}H_{35}BrN_2O$: Br, 17.39; N, 6.10. Found: Br, 17.69; N, 6.25.

EXAMPLE 8

*Preparation of 4-Diethylamino-N,N-Diisopropyl-2,2-Diphenylbutyramide Free Base and Derivatives Thereof*

(A) N,N-DIISOPROPYL-α,α-DIPHENYLACETAMIDE

A solution of 76 grams (0.33 mole) of diphenylacetyl chloride in 200 milliliters of benzene was placed in a one-liter three-neck flask equipped with a reflux condenser, stirrer, and dropping funnel. A solution of 101.2 grams (one mole) of freshly distilled diisopropylamine in 200 milliliters of benzene was gradually added with stirring. The reaction mixture was stirred for one hour at reflux temperature, cooled, and solid material was removed by filtration. The benzene solution was washed successively with dilute hydrochloric acid, dilute aqueous sodium hydroxide solution, and water, and then dried with anhydrous sodium sulfate. Benzene was removed by distillation under reduced pressure, leaving a gum which crystallized upon being triturated. This crude product was recrystallized from n-pentane. There was thus obtained 58.5 grams (sixty percent yield) of N,N-diisopropyl-α,α-diphenylacetamide having a melting point of 53–55 degrees centigrade and the following analysis:

*Analysis.*—Calcd. for $C_{20}H_{25}NO$: C, 81.31; H, 8.53; N, 4.47. Found: C, 81.26; H, 8.59; N, 4.88.

(B) 4-DIETHYLAMINO-N,N-DIISOPROPYL-2,2-DIPHENYLBUTYRAMIDE FREE BASE

A slurry of 59.1 grams (0.2 mole) of N,N-diisopropyl-α,α-diphenylacetamide (part A, this example), 8.6 grams (0.22 mole) of sodium amide, and 250 milliliters of dry toluene in a one-liter, three-neck flask equipped with stirrer, reflux condenser, and dropping funnel was heated at reflux temperature for two hours. A solution of 0.2 mole of 2-diethylaminoethyl chloride in 200 milliliters of toluene was gradually added, and the reaction mixture was heated at reflux temperature for one hour. The mixture was cooled, washed with water, and extracted with dilute hydrochloric acid prepared by mixing thirty milliliters of concentrated hydrochloric acid and 200 milliliters of water, the acid extract then being made basic by adding 150 milliliters of aqueous twenty percent sodium hydroxide solution. The resulting oil was extracted with benzene, the benzene solution was dried with anhydrous sodium sulfate, and the benzene was removed by distillation under reduced pressure, leaving a gum which slowly solidified. By recrystallizing this solid from n-pentane there was obtained 69 grams (88 percent yield) of 4-diethylamino-N,N-diisopropyl-2,2-diphenylbutyramide free base melting at 72–74 degrees centigrade and having the following analysis:

*Analysis.*—Calcd. for $C_{26}H_{38}N_2O$: C, 79.14; H, 9.71; N, 7.10. Found: C, 79.29; H, 9.56; N, 7.16.

(C) 4-DIETHYLAMINO-N,N-DIISOPROPYL-2,2-DIPHENYLBUTYRAMIDE HYDROCHLORIDE

To a solution of ten grams (0.025 mole) of the above 4-diethylamino-N,N-diisopropyl-2,2-diphenylbutyramide free base in 100 milliliters of ethyl acetate was added a slight excess of ethanolic hydrogen chloride. Addition of ether caused precipitation of a gummy solid which was recrystallized from methyl ethyl ketone to obtain six grams (55 percent yield) of 4-diethylamino-N,N- diisopropyl-2,2-diphenylbutyramide hydrochloride having a melting point of 208–210 degrees centigrade and the following analysis:

Analysis.—Calcd. for $C_{26}H_{39}ClN_2O$: C, 72.44; H, 9.12; Cl, 8.23; N, 6.50. Found: C, 72.08; H, 8.78; Cl, 8.09; N, 6.37.

(D) 4-DIETHYLAMINO-N,N-DIISOPROPYL-2,2-DI-PHENYLBUTYRAMIDE METHOBROMIDE

Ten grams (0.025 mole) of the above 4-diethylamino-N,N-diisopropyl-2,2-diphenylbutyramide free base was dissolved in 100 milliliters of methyl ethyl ketone, forty grams (0.42 mole) of methyl bromide was added, and the solution was allowed to stand in a stoppered flask at room temperature for 72 hours. Addition of ether caused a solid to precipitate. This solid was recrystallized from a mixture of ether and methyl ethyl ketone, to obtain ten grams (82 percent yield) of 4-diethylamino-N,N - diisopropyl - 2,2 - diphenylbutyramide methobromide having a melting point of 129–132 degrees centigrade and the following analysis:

Analysis.— Calcd. for $C_{27}H_{41}BrN_2O$: C, 66.24; H, 8.44; Br, 16.33; N, 5.72. Found: C, 66.20; H, 8.13; Br, 16.34; N, 5.44.

EXAMPLE 9

Preparation of N,N-Diisopropyl-2,2,4-Trimethyl-α,α-Diphenyl-1-Pyrrolidinebutyramide Free Base and Derivatives Thereof (A) 1-(2-CHLOROETHYL)-2,2,4-TRIMETHYLPYR-ROLIDINE HYDROCHLORIDE Gaseous hydrogen chloride was passed into a solution of 42 grams (0.267 mole) of 2,2,4-trimethyl-1-pyrrolidine-ethanol [Moffett et al., J. Org. Chem., 17, 407 (1952)] in 200 milliliters of benzene, with stirring and ice-bath cooling, until the solution was strongly acidic. With continued stirring and cooling, 24.5 grams (0.4 mole) of thionyl chloride was gradually added, and the reaction mixture was heated at reflux temperature for two hours. About fifty milliliters of solvent was removed by distillation and the mixture was cooled. The resulting crystalline 1-(2-chloroethyl)-2,2,4-trimethylpyrrolidine hydrochloride was collected, washed with anhydrous ether, and dried; yield 55.3 grams (98 percent); melting point, 162–165 degrees centigrade. This compound, after recrystallization from isopropyl alcohol, had a melting point of 164–166 degrees centigrade and the following analysis:

Analysis.—Calcd. for $C_9H_{19}Cl_2N$: C, 50.95; H, 9.03; Cl, 33.42; N, 6.60. Found: C, 51.29; H, 9.19; Cl, 33.22; N, 6.96.

(B) N,N-DIISOPROPYL-2,2,4-TRIMETHYL-α,α-DIPHENYL-1-PYRROLIDINEBUTYRAMIDE FREE BASE AND HYDROCHLORIDE THEREOF

A slurry of 51.1 grams (0.173 mole) of N,N-diisopropyl-α,α-diphenylacetamide (Example 8, part A), 7.1 grams (0.182 mole) of sodium amide, and 250 milliliters of dry toluene in a one-liter, three-neck flask equipped with stirrer, reflux condenser, and dropping funnel was heated at reflux temperature for two hours. A 36.5 gram (0.173 mole) portion of 1-(2-chloroethyl)-2,2,4-trimethylpyrrolidine hydrochloride (Part A, this example) was converted to the free base by treatment with aqueous fifty percent sodium hydroxide solution, and the free base was extracted into 200 milliliters of toluene. This toluene solution was dried and gradually added to the aforesaid slurry, and the reaction mixture was heated at reflux temperature for one hour. The mixture was cooled, washed with water, and extracted with dilute hydrochloric acid prepared by mixing fifty milliliters of concentrated acid and 200 milliliters of water. The rather cloudy acid extract was washed with ether, and N,N-diisopropyl - 2,2,4 - trimethyl - α,α - diphenyl - 1 - pyrrolidinebutyramide hydrochloride precipitated. This compound after being recrystallized from 300 milliliters of ethyl acetate weighed 41.5 grams (51 percent yield), and had a melting point of 228–230 degrees centigrade and the following analysis:

Analysis.—Calcd. for $C_{29}H_{43}ClN_2O$: C, 73.93; H, 9.20; Cl, 7.53; N, 5.95. Found: C, 73.28; H, 9.47; Cl, 7.71; N, 6.00.

(C) N,N-DIISOPROPYL-2,2,4-TRIMETHYL-α,α-DIPHENYL-1-PYRROLIDINEBUTYRAMIDE METHOBROMIDE

Twelve grams (0.026 mole) of N,N-diisopropyl-2,2,4-trimethyl - α,α - diphenyl - 1 - pyrrolidinebutyramide hydrochloride (part B, this example) was treated with fifty milliliters of aqueous ten percent sodium hydroxide solution, and the mixture was extracted with benzene. The benzene solution was washed successively with saturated aqueous sodium chloride solution and water, dried with anhydrous sodium sulfate, and evaporated to dryness under reduced pressure. The resulting oily N,N-diisopropyl - 2,2,4 - trimethyl - α,α - diphenyl - 1 - pyrrolidinebutyramide free base was dissolved in 100 milliliters of methyl ethyl ketone, forty grams (0.42 mole) of cold methyl bromide was added, and the reaction mixture was kept in a stoppered flask at room temperature for 24 hours. The resulting N,N-diisopropyl-2,2,4-trimethyl-α,α - diphenyl - 1 - pyrrolidinebutyramide methobromide, after being collected and dried in a vacuum oven at sixty degrees centigrade, weighed 11.5 grams (85.5 percent yield), and had a melting point of 226–228 degrees centigrade and the following analysis:

Analysis.—Calcd. for $C_{30}H_{45}BrN_2O$: C, 68.03; H, 8.56; Br, 15.09; N, 5.29. Found: C, 68.21; H, 8.65; Br, 14.95; N, 5.30.

EXAMPLE 10

Preparation of 4-Diethylamino-N,N-Dimethyl-2,2-Diphenylbutyramide Free Base and Derivatives Thereof (A) 4-DIETHYLAMINO-N,N-DIMETHYL-2,2-DIPHENYL-BUTYRAMIDE FREE BASE A slurry of 54 grams (0.226 mole) of N,N-dimethyl-α,α-diphenylacetamide [Gokhale et al., J. Univ. Bombay, 16, No. 5, 32–36 (1948)]; C.A., 43, 1144 (1949)], 9.7 grams (0.249 mole) of sodium amide, and 500 milliliters of dry toluene in a two-liter, three-neck flask equipped with stirrer, reflux condenser, and dropping funnel was heated at reflux temperature for four hours. A solution of 30.65 grams (0.226 mole) of 2-diethylaminoethyl chloride in 150 milliliters of toluene was gradually added and the reaction mixture was heated at reflux temperature for 0.5 hour. The mixture was washed with 250 milliliters of water and extracted with 250 milliliters of 4.6 percent hydrochloric acid. The acid extract was treated with 150 milliliters of aqueous twenty percent sodium hydroxide solution, the mixture was extracted with benzene, and the benzene extract was dried with anhydrous sodium sulfate. Benzene was removed by distillation under reduced pressure, to obtain 70.3 grams (92 percent yield) of oily 4-diethylamino-N,N-dimethyl-2,2-diphenylbutyramide free base.

(B) 4-DIETHYLAMINO-N,N-DIMETHYL-2,2-DIPHENYL-BUTYRAMIDE HYDROCHLORIDE

A slight excess of ethanolic hydrogen chloride was added to a solution of 70.3 grams of 4-diethylamino-N,N-dimethyl-2,2-diphenylbutyramide free base (part A, this example) in 500 milliliters of ethyl acetate. Addition of ether caused precipitation of a gum which became solid upon trituration. Recrystallization of this solid from acetone yielded 4-diethylamino-N,N-dimethyl-2,2-diphenylbutyramide hydrochloride having a melting point of 184–186 degrees centigrade and the following analysis:

Analysis.—Calcd. for $C_{22}H_{31}ClN_2O$: C, 70.47; H, 8.33; Cl, 9.46; N, 7.47. Found: C, 70.42; H, 8.45; Cl, 9.44; N, 7.33.

(C) 4-DIETHYLAMINO-N,N-DIMETHYL-2,2-DIPHENYL-BUTYRAMIDE METHOBROMIDE

By substituting 4 - diethylamino - N,N - dimethyl - 2,2- diphenylbutyramide free base for 4-diethylamino-N,N-diisopropyl-2,2-diphenylbutyramide free base in the procedure of Example 8, part D, 4-diethylamino-N,N-dimethyl-2,2-diphenylbutyramide methobromide was prepared. Upon recrystallization from a mixture of ether and isopropyl alcohol the compound had a melting point of 177–179 degrees centigrade and the following analysis:

Analysis.—Calcd. for $C_{23}H_{33}BrN_2O$: C, 63.73; H, 7.67; Br, 18.44; N, 6.46. Found: C, 64.09; H, 7.72; Br, 17.73; N, 6.29.

EXAMPLE 11

*Preparation of 4-Dimethylamino-N,N-Dimethyl-2,2-Diphenylbutyramide Free Base and Derivatives Thereof*

(A) 4-DIMETHYLAMINO-N,N-DIMETHYL-2,2-DIPHENYLBUTYRAMIDE FREE BASE

By following the procedure of Example 10, part A, but substituting 2-dimethylaminoethyl chloride for 2-diethylaminoethyl chloride, there was obtained solid 4-dimethylamino-N,N-dimethyl-2,2-diphenylbutyramide free base. Recrystallization from Skellysolve B (mixture of hexanes) provided an eighty percent yield of purified product having a melting point of 97–99 degrees centigrade and the following analysis:

Analysis.—Calcd. for $C_{20}H_{26}N_2O$: C, 77.37; H, 8.44; N, 9.03. Found: C, 76.78; H, 8.84; N, 9.11.

(B) 4-DIMETHYLAMINO-N,N-DIMETHYL-2,2-DIPHENYLBUTYRAMIDE HYDROCHLORIDE

By following the procedure of Example 10, part B, but substituting 4-dimethylamino-N,N-dimethyl-2,2-diphenylbutyramide free base (part A, this example) for 4-diethylamino-N,N-dimethyl-2,2-diphenylbutyramide free base, there was obtained 4-dimethylamino-N,N-dimethyl-2,2-diphenylbutyramide hydrochloride, which after recrystallization from a mixture of ether and isopropyl alcohol had a melting point of 228–230 degrees centigrade and the following analysis:

Analysis.—Calcd. for $C_{20}H_{27}ClN_2O$: C, 69.24; H, 7.85; Cl, 10.22; N, 8.08. Found: C, 69.08; H, 7.88; Cl, 10.21; N, 7.95.

(C) 4-DIMETHYLAMINO-N,N-DIMETHYL-2,2-DIPHENYLBUTYRAMIDE METHOBROMIDE

By following the procedure of Example 10, part C, but substituting 4-dimethylamino-N,N-dimethyl-2,2-diphenylbutyramide free base (part A, this example) for 4-diethylamino-N,N-dimethyl-2,2-diphenylbutyramide free base, there was obtained an 81 percent yield of 4-dimethylamino-N,N-dimethyl-2,2-diphenylbutyramide methobromide having a melting point of 225–227 degrees centigrade and the following analysis:

Analysis.—Calcd. for $C_{21}H_{29}BrN_2O$: C, 62.22; H, 7.21; Br, 19.71; N, 6.91. Found: C, 62.18; H, 7.04; Br, 19.41; N, 6.64.

EXAMPLE 12

*Preparation of N,N,2,2-Tetramethyl-α,α-Diphenyl-1-Pyrrolidinebutyramide Free Base and Derivatives Thereof*

(A) N,N,2,2-TETRAMETHYL-α,α-DIPHENYL-1-PYRROLIDINEBUTYRAMIDE FREE BASE

By following the procedure of Example 10, part A, but substituting 1-(2-chloroethyl)-2,2-dimethylpyrrolidine for 2-diethylaminoethyl chloride, there was obtained N,N,2,2-tetramethyl - α,α - diphenyl - 1 - pyrrolidinebutyramide free base as a solid. After recrystallization from Skellysolve B (mixture of hexanes) the yield was 53 percent; the product had a melting point of 110–112 degrees centigrade and the following analysis:

Analysis.—Calcd. for $C_{24}H_{32}N_2O$: C, 79.07; H, 8.85; N, 7.68. Found: C, 79.04; H, 8.96; N, 7.71.

(B) N,N,2,2-TETRAMETHYL-α,α-DIPHENYL-1-PYRROLIDINEBUTYRAMIDE HYDROCHLORIDE

By following the procedure of Example 10, part B, but substituting N,N,2,2 - tetramethyl - α,α - diphenyl - 1-pyrrolidinebutyramide free base (part A, this example) for 4-diethylamino-N,N-dimethyl-2,2-diphenylbutyramide free base, there was obtained N,N,2,2-tetramethyl-α,α-diphenyl-1-pyrrolidinebutyramide hydrochloride, which after recrystallization from ethyl acetate had a melting point of 205–207 degrees centigrade and the following analysis:

Analysis.—Calcd. for $C_{24}H_{33}ClN_2O$: C, 71.88; H, 8.29; Cl, 8.84; N, 6.99. Found: C, 71.86; H, 8.40; Cl, 8.56; N, 7.07.

(C) N,N,2,2-TETRAMETHYL-α,α-DIPHENYL-1-PYRROLIDINEBUTYRAMIDE METHOBROMIDE

By following the procedure of Example 10, part C, but substituting N,N,2,2 - tetramethyl - α,α - diphenyl - 1-pyrrolidinebutyramide free base (part A, this example) for 4 - diethylamino - N,N - dimethyl - 2,2 - diphenylbutyramide free base and recrystallizing the crude product from methyl ethyl ketone, there was obtained a 77 percent yield of N,N,2,2-tetramethyl-α,α-diphenyl-1-pyrrolidinebutyramide methobromide having a melting point of 200–202 degrees centigrade.

(D) N,N,2,2-TETRAMETHYL-α,α-DIPHENYL-1-PYRROLIDINEBUTYRAMIDE N-OXIDE FREE BASE

A solution of 14.6 grams (0.04 mole) of N,N,2,2-tetramethyl - α,α - diphenyl - 1 - pyrrolidinebutyramide free base (part A, this example) in 150 milliliters of methyl alcohol was treated with ten milliliters of thirty percent hydrogen peroxide, and the reaction mixture was allowed to stand at room temperature for two days. An aqueous slurry of platinum-on-charcoal was added to the mixture which was then agitated for 1.5 hours. The mixture was filtered and the filtrate was evaporated to dryness under reduced pressure, the temperature being maintained below thirty degrees centigrade. N,N,2,2-tetramethyl-α,α-diphenyl-1-pyrrolidinebutyramide N-oxide free base was thus obtained as a yellow gum.

(E) N,N,2,2-TETRAMETHYL-α,α-DIPHENYL-1-PYRROLIDINEBUTYRAMIDE N-OXIDE HYDROBROMIDE

The procedure of part D, this example, was repeated through the filtration step noted therein. The filtrate thus obtained was acidified with concentrated hydrobromic acid (48 percent aqueous hydrobromic acid), giving a gummy material which slowly crystallized. This solid was first triturated with ethyl acetate and then recrystallized from isopropyl alcohol. There was thus obtained N,N,2,2 - tetramethyl-α,α-diphenyl - 1 - pyrrolidinebutyramide N-oxide hydrobromide (light tan crystals) having a melting point of 158–162 degrees centigrade (decomposition) and the following analysis:

Analysis.—Calcd. for $C_{24}H_{33}BrN_2O_2$: C, 62.60; H, 7.01; Br, 17.36; N, 6.08. Found: C, 62.84; H, 7.19; Br, 17.27; N, 6.42.

EXAMPLE 13

*Preparation of 4-Diisopropylamino - N,N - Dimethyl-2,2-Diphenylbutyramide Free Base and Derivatives Thereof*

(A) 4-DIISOPROPYLAMINO-N,N-DIMETHYL-2,2-DIPHENYLBUTYRAMIDE FREE BASE

A slurry of 35.4 grams (0.148 mole) of N,N-dimethyl-α,α-diphenylacetamide, 6.6 grams (0.168 mole) of sodium amide, and 250 milliliters of dry toluene in a one-liter, three-neck flask equipped with stirrer, reflux condenser, and dropping funnel was heated at reflux temperature for two hours. 29.5 grams (0.148 mole) of 2-diisopropylaminoethyl chloride hydrochloride [Wright et al., J. Am. Chem. Soc., 72, 3536 (1950)] was converted to the free base by treatment with aqueous fifty percent sodium hydroxide solution, and the free base was extracted into 200 milliliters of toluene. This toluene solution was dried and gradually added to the above slurry, and the reaction mixture was heated at reflux temperature for one hour. The mixture was cooled, washed with water, and extracted with dilute hydrochloric acid prepared by mixing forty milliliters of concentrated acid and 200 milliliters of water. The acid extract was made basic by adding 200 milliliters of aqueous twenty percent sodium hydroxide solution, and the resulting oily material was extracted with benzene. The solution was dried with anhydrous sodium sulfate and the benzene was removed by distillation under reduced pressure. The residual viscous oil became solid when triturated with a little n-pentane. The solid was recrystallized from n-pentane, to obtain 44 grams (82 percent yield) of 4-diisopropylamino-N,N-dimethyl-2,2-diphenylbutyramide free base having a melting point of 74–76 degrees centigrade and the following analysis:

*Analysis.*—Calcd. for $C_{24}H_{34}N_2O$: C, 78.72; H, 9.36; N, 7.65. Found: C, 79.09; H, 9.26; N, 7.75.

(B) 4-DIISOPROPYLAMINO-N,N-DIMETHYL-2,2-DIPHENYLBUTYRAMIDE HYDROCHLORIDE

A slight excess of ethanolic hydrogen chloride was added to a solution of ten grams (0.027 mole) of 4-diisopropylamino - N,N-dimethyl-2,2-diphenylbutyramide free base (part A, this example). Addition of ether caused precipitation of solid 4-diisopropylamino-N,N-dimethyl - 2,2 - diphenylbutyramide hydrochloride, which upon recrystallization from an ethyl alcohol-ethyl acetate mixture weighed seven grams (64 percent yield) and had a melting point of 205–207 degrees centigrade and the following analysis:

*Analysis.*—Calcd. for $C_{24}H_{35}ClN_2O$: C, 71.52; H, 8.75; Cl, 8.80; N, 6.95. Found: C, 71.56; H, 8.62; Cl, 8.84; N, 7.09.

(C) 4-DIISOPROPYLAMINO-N,N-DIMETHYL-2,2-DIPHENYLBUTYRAMIDE METHOBROMIDE

Forty grams (0.42 mole) of methyl bromide was added to a solution of ten grams (0.027 mole) of 4-diisopropylamino-N,N-dimethyl - 2,2 - diphenylbutyramide free base (Part A, this example) in 150 milliliters of methyl ethyl ketone, and the mixture was allowed to stand in a stoppered flask at room temperature for 72 hours. Crystallization was induced by heating the mixture on a steam-bath. There was thus obtained ten grams (81 percent yield) of 4-diisopropylamino-N,N-dimethyl-2,2-diphenylbutyramide methobromide having a melting point of 188–190 degrees centigrade and the following analysis:

*Analysis.*—Calcd. for $C_{25}H_{37}BrN_2O$: C, 65.06; H, 8.08; Br, 17.32; N, 6.07. Found: C, 65.09; H, 8.11; Br, 17.43; N, 6.00.

EXAMPLE 14

*Preparation of N,N,2,2,4-Pentamethyl - α,α - Diphenyl-1-Pyrrolidinebutyramide Free Base and Derivatives Thereof*

(A) N,N,2,2,4-PENTAMETHYL-α,α-DIPHENYL-1-PYRROLIDINEBUTYRAMIDE FREE BASE

A slurry of 41.3 grams (0.173 mole) of N,N-dimethyl-α,α-diphenylacetamide, 7.1 grams (0.182 mole) of sodium amide, and 250 milliliters of dry toluene in a one-liter, three-neck flask equipped with stirrer, reflux condenser, and dropping funnel was heated at reflux temperature for two hours. A solution of 1-(2-chloroethyl)-2,2,4-trimethylpyrrolidine in 200 milliliters of toluene was gradually added, and the reaction mixture was heated at reflux temperature for one hour. The mixture was cooled, washed with water, extracted with dilute hydrochloric acid (fifty milliliters of concentrated acid and 200 milliliters of water), and the acid extract was made basic with 200 milliliters of aqueous twenty percent sodium hydroxide solution. The resulting gum solidified and was recrystallized from cyclohexane. There was thus obtained thirty grams of N,N,2,2,4-pentamethyl-α,α-diphenyl - 1 - pyrrolidinebutyramide free base having a melting point of 102–104 degrees centigrade and the following analysis:

*Analysis.*—Calcd. for $C_{25}H_{34}N_2O$: C, 79.32; H, 9.05; N, 7.40. Found: C, 79.53; H, 8.99; N, 7.32.

(B) N,N,2,2,4-PENTAMETHYL-α,α-DIPHENYL-1-PYRROLIDINEBUTYRAMIDE HYDROCHLORIDE

A slight excess of ethanolic hydrogen chloride was added to a solution of ten grams (0.024 mole) of N,N,2,2,4 - pentamethyl-α,α-diphenyl-1-pyrrolidinebutyramide free base (Part A, this example) in 100 milliliters of ethyl acetate, and the mixture was stored in the refrigerator overnight. The resulting N,N,2,2,4-pentamethyl-α,α-diphenyl-1-pyrrolidinebutyramide hydrochloride weighed 5.5 grams (55 percent yield), and had a melting point of 218–220 degrees centigrade and the following analysis:

*Analysis.*—Calcd. for $C_{25}H_{35}ClN_2O$: C, 72.35; H, 8.50; Cl, 8.54; N, 6.75. Found: C, 71.89; H, 8.48; Cl, 8.51; N, 6.65.

(C) N,N,2,2,4-PENTAMETHYL-α,α-DIPHENYL-1-PYRROLIDINEBUTYRAMIDE METHOBROMIDE

Ten grams (0.024 mole) of N,N,2,2,4-pentamethyl-α,α-diphenyl-1-pyrrolidinebutyramide free base (part A, this example) was dissolved in 100 milliliters of methyl ethyl ketone, thirty grams of methyl bromide was added, and the mixture was stored in a stoppered flask at room temperature for 24 hours. Excess methyl bromide was then evaporated. There was thus obtained 10.5 grams (86 percent yield) of N,N,2,2,4-pentamethyl-α,α-diphenyl 1-pyrrolidine butyramide methobromide having a melting point of 195–197 degrees centigrade and the following analysis:

*Analysis.*—Calcd. for $C_{26}H_{37}BrN_2O$: C, 65.96; H, 7.88; Br, 16.88; N, 5.92. Found: C, 65.75; H, 8.33; Br, 16.83; N, 5.67.

EXAMPLE 15

*1-[2,2-Diphenyl-4-(2,2-Dimethylpyrrolidino)Butyryl] Pyrrolidine Free Base and Derivatives Thereof*

Following the procedure of Example 7, but substituting 1-(2-chloroethyl)-2,2-dimethylpyrrolidine for 2-diethylaminoethyl chloride used therein 1-[2,2-diphenyl-4-(2,2-dimethylpyrrolidino)-butyryl]pyrrolidine free base and derivatives thereof can be produced.

EXAMPLE 16

*1-(4-Diethylamino-2,2-Diphenylbutyryl)-2-Methylpyrrolidine Free Base and Derivatives Thereof*

Following the procedure of Example 7, but substituting 2-methylpyrrolidine for pyrrolidine used therein 1-(4-diethylamino-2,2-diphenylbutyryl)-2-methylpyrrolidine free base and derivatives thereof can be produced.

EXAMPLE 17

*2-Methyl-1-[2,2-Diphenyl-4-(2,2-Dimethylpyrrolidino) Butyryl]pyrrolidine Free Base and Derivatives Thereof*

Following the procedure of Example 7, part A but substituting 2-methylpyrrolidine for pyrrolidine used therein, 1-diphenylacetyl-2-methylpyrrolidine can be produced, which can then be reacted with 1-(2-chloroethyl)-2,2-dimethylpyrrolidine to produce 2-methyl-1-[2,2-diphenyl-4-(2,2-dimethylpyrrolidino)butyryl]pyrrolidine free base and derivatives thereof.

It will be understood that the compounds of this invention include optically inactive forms, e.g., the products of Examples 1, 2, 6, and 10, and optically active forms, e.g., the products of Examples 4 and 5.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound having the following basic formula:

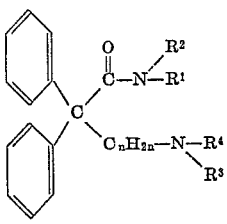

wherein $n$ is an integer from two to six, inclusive, —$C_nH_{2n}$— is an alkylene radical having at least two carbon atoms between the valences, $R^1$ and $R^2$ are selected from the group consisting of a lower-alkyl radical and when taken together with —N< represents pyrrolidino and alkyl-substituted pyrrolidino, $R^3$ and $R^4$ are selected from the group consisting of a lower-alkyl radical and when taken together with —N< represent alkyl-substituted pyrrolidino.

2. A compound having the following formula:

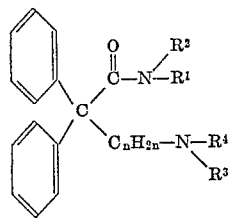

where $n$ is an integer from two to six, inclusive, —$C_nH_{2n}$— is an alkylene radical having at least two carbon atoms between the valences, $R^1$ and $R^2$ are lower-alkyl radicals, and $R^3$ and $R^4$ taken together with —N< represent alkyl-substituted pyrrolidino.

3. A compound having the following formula:

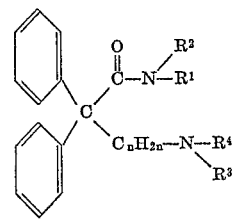

wherein $n$ is an integer from two to six, inclusive, —$C_nH_{2n}$— is an alkylene radical having at least two carbon atoms between the valences, and $R^1$, $R^2$, $R^3$, and $R^4$ are lower-alkyl radicals.

4. A compound having the following formula:

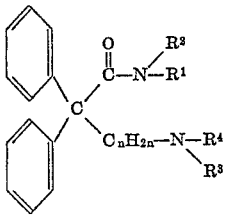

where $n$ is an integer from two to six, inclusive, —$C_nH_{2n}$— is an alkylene radical having at least two carbon atoms between the valences, $R^1$ and $R^2$ taken together with —N< represent pyrrolidino, and $R^3$ and $R^4$ are lower-alkyl radicals.

5. $l$-4-dimethylamino-N,N-dimethyl-2,2-diphenylvaleramide hydrochloride.

6. 1 - (4-diethylamino-2,2-diphenylbutyryl)pyrrolidine hydrochloride.

7. 4-dimethylamino-N,N-dimethyl - 2,2 - diphenylbutyramide hydrochloride.

8. N,N,2,2-tetramethyl-$\alpha$,$\alpha$-diphenyl-1-pyrrolidinebutyramide hydrochloride.

References Cited in the file of this patent

UNITED STATES PATENTS 2,647,926     Speeter _____ Aug. 4, 1953

FOREIGN PATENTS 504,085     Belgium _____ July 14, 1951

OTHER REFERENCES

Jour. Org. Chem., vol. 17, pages 770–777 (1952).

Zaugg et al.: Journal of the American Chemical Society, volume 73, page 290 (1953).